United States Patent [19]

Margulis et al.

[11] Patent Number: 5,642,453

[45] Date of Patent: Jun. 24, 1997

[54] ENHANCING THE NONLINEARITY OF AN OPTICAL WAVEGUIDE

[75] Inventors: Walter Margulis, Rio de Janeiro, Brazil; Anne Ingrid Birgitta Lidgard, Stockholm, Sweden

[73] Assignee: Telefonaktiebolaget L M Ericsson, Stockholm, Sweden

[21] Appl. No.: 416,718

[22] PCT Filed: Aug. 15, 1994

[86] PCT No.: PCT/SE94/00745

§ 371 Date: Jun. 14, 1995

§ 102(e) Date: Jun. 14, 1995

[87] PCT Pub. No.: WO95/05617

PCT Pub. Date: Feb. 23, 1995

[30] Foreign Application Priority Data

Aug. 13, 1993 [SE] Sweden ................. 9302634

[51] Int. Cl.⁶ ..................................... G02B 6/26
[52] U.S. Cl. .......................... 385/122; 372/6; 385/30; 385/126; 385/131; 385/132; 385/146; 385/24
[58] Field of Search ................. 372/6; 385/122, 385/30, 27, 28, 29, 51, 123, 126, 129, 130, 131, 132, 146, 24

[56] References Cited

U.S. PATENT DOCUMENTS

| | | | |
|---|---|---|---|
| 4,557,551 | 12/1985 | Dyott | 350/96.15 |
| 4,815,817 | 3/1989 | Levinson | 385/30 |
| 4,927,223 | 5/1990 | Pocholle et al. | 350/96.15 |
| 4,962,987 | 10/1990 | Doran | 350/96.15 |
| 4,973,122 | 11/1990 | Cotter et al. | 350/96.15 |
| 5,285,508 | 2/1994 | Chikuma | 385/30 |
| 5,448,665 | 9/1995 | Kershaw et al. | 385/30 |
| 5,513,288 | 4/1996 | Mayer | 385/30 |

FOREIGN PATENT DOCUMENTS

| | | |
|---|---|---|
| 0 164 212 | 12/1985 | European Pat. Off. |
| 0 254 509 | 1/1988 | European Pat. Off. |

OTHER PUBLICATIONS

"All-Optical Waveguide Switching", G.I. Stegeman, E.M. Wright, Optical and Quantum Electronics 22 (1990), pp. 95–122.

"Integrated Optics in LiNbO₃: Recent Developments in Devices for Telecommunications", L. Thylén, Journal of Lightwave Tech., 6 (1988) pp. 847–861.

"Integrated Optic Devices Based on Nonlinear Optical Polymers", E.V. Tomme, P.P. Van Daele, R.G. Baets, P.E. Lagasse, IEEE Journal of Quantum Electronics, vol. 27, Mar. 1991.

"Optical Nonlinearity and Applications of semiconductor-doped Glass Fiber", D. Cotter, B.J. Ainslie, M.G. Burn, S.T. Davey, R.J. Manning, Proceedings CLEO'91, CTuE7, p. 92.

"Efficient non-linear optical fibers and their applications", S. Sudo, H. Itoh, Optical and Quantum Electronics 22 (1990) pp. 187–212.

"Fabrication and Characterization of D-fibers with a Range of Accurately Controlled Core/Flat Distances", Electronics Letters 22, Mar. 1986.

"Optical Waveguide Theory", A.W. Snyder, J.D. Love, Chapman and Hall, London 1983, pp. 387–399, 568–574.

"Silica Waveguides on Silicon and their Application to Integrated-Optic Components", Optical and Quantum Electronics 22 (1990), pp. 391–416.

Primary Examiner—John Ngo
Attorney, Agent, or Firm—Burns, Doane, Swecker & Mathis, L.L.P.

[57] ABSTRACT

An optical device includes a waveguide and a film or layer of a material having highly nonlinear optical characteristics, in particular a semiconductor material. The film is located so close to the waveguide core that the evanescent field of light propagating along the waveguide extends up to the film. In this optical device, the large nonlinear properties of the material influence the optical characteristics of the waveguide. When positioned along a similar D-fiber, the device can be used as a fiber-based, nonlinear coupler controlled by a relatively weak light signal. The same device can be used as an element of a laser and in a number of various other applications.

39 Claims, 2 Drawing Sheets

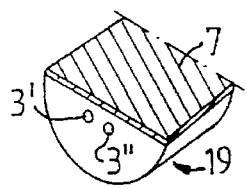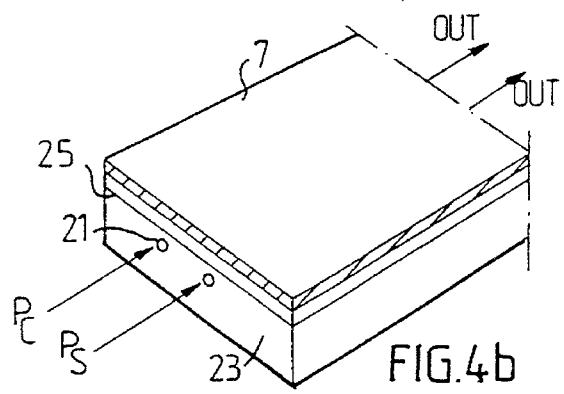
FIG.4a   FIG.4b
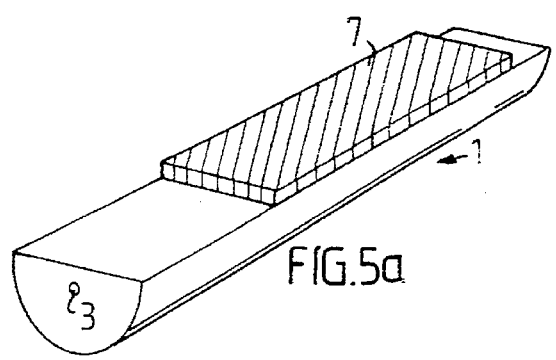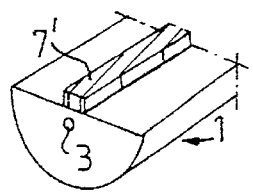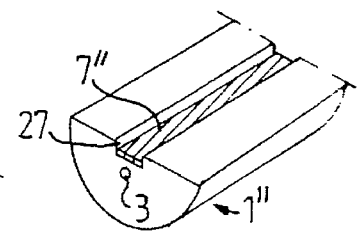
FIG.5a   FIG.5c   FIG.5b
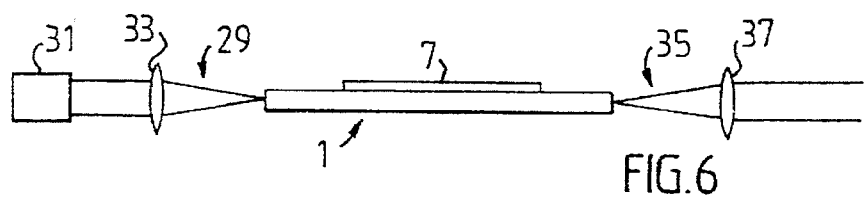
FIG.6
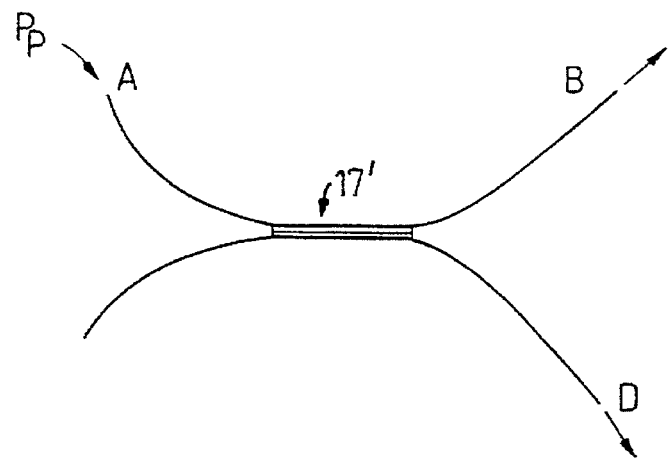
FIG.7

ENHANCING THE NONLINEARITY OF AN OPTICAL WAVEGUIDE

BACKGROUND

The present invention is concerned with waveguides for optical and near optical wavelengths adopted to use nonlinear optical effects of particular kinds and of particular materials.

This application claims priority from Swedish Patent Application No. 9302634-2, filed Aug. 13, 1993, which is incorporated here by reference.

Optical glass fibers are a cheap waveguide medium that can be exploited for applications in nonlinear optics. Fused quartz, however, has a small nonlinear coefficient as compared with materials such as semiconductors. This has limited considerably the use of fibers in applications such as optical switching, because the optical power of the control signal has to be high in order to cause an appreciable change in the properties of the fiber, see "All-optical Waveguide Switching", G. I. Stegeman, E. M. Wright, Optical and Quantum Electronics 22 (1990), pps. 95–122. This led to the use of discrete components based on $LiNbO_3$, GaAs and others, see "Integrated Optics in $LiNbO_3$: Recent Developments in Devices for Telecommunications", L. Thylen, Journal of Lightwave Tech., 6 (1988) pps. 847–861, "Integrated Optic Devices Based on Nonlinear optical Polymers", E. V. Tomme, P. P van Daele, R. G. Basts, P. E. Lagasse, IEEE Journal of Quantum Electronics vol. 27, Mar. 1991 and "Physical Concepts of Materials for Novel Optoelectronic Device Applications II: Device Physics and Applications", Proceedings SPIE 1362 (1990), and to the search for optical fibers with higher nonlinearity, such as that achieved with semiconductor doped glasses, see "Optical Nonlinearity and Applications of semiconductor-doped Glass Fiber", D. Cotter, B. J. Ainslie, M. G. Butt, S. T. Davey, R. J. Manning, Proceedings CLEO'91, CTuE7, p. 92, and "Efficient non-linear optical fibers and their application", S. Sudo, Itoh, Optical and Quantum Electronics 22 (1990) pps. 187–212, but that are difficult to fabricate. On the other hand, following the development of optical communications the need exists for a simple fiber-based light controlled coupler. With such a device it would be possible to derive an adjustable part of the signal transmitted in a fiber to one or several channels in a transmission network. A fiber based nonlinear optical coupler could also find important applications in logical gates and optical transistors, where a weak signal would control the switching of a higher power signal.

Recent technological developments led to the fabrication of glass fibers with non-cylindrical geometry, and in particular the so-called D-shaped fibers, see "Fabrication and Characterization of D-fibers with a Range of Accurately Controlled Core/Flat Distances", Electronics Letters 22, March 1986. There, light is guided as in a conventional fiber, but the electromagnetic field extends all the way to the glass-air interface. This offers a unique opportunity to make light interact through the evanescent field with any material deposited on the flat surface of the D-shaped fiber. Since this interaction takes place longitudinally along the fiber, this is a particularly favourable geometry that can be exploited in nonlinear optics.

In the patent U.S. Pat. No. 4,557,551 for Dyott a non-linear optical fiber coupler is disclosed having two polarization-maintaining optical fibers of elliptical cross-sections located in parallel at the opposite sides of a central structure. This central structure has a lens-shaped cross-section, that is formed by two oppositely placed arc sections. The central thickness of this middle structure is a few times larger than the diameters of the fibers and many times the diameters of the cores of the fibers. Also, support structures are used for maintaining the fibers in the desired configurations. The middle structure is a single crystal of an electro-optic material having a non-centro-symmetrical crystal structure. The materials mentioned are organic type materials being electric insulators. The physical effect utilized is based on the electro-optical effect, the refractive index of the material being changed by interaction with the electric field of an incoming light wave, the pump wave.

In the European patent application EP-A2 0 164 212 for The Board of Trustees of the Leland Stanford Junior University a fiber optic saturable absorber is disclosed. An optical fiber has a portion of its cladding removed by polishing a slightly curved fiber along plane. A light-absorbing substance having non-linear light-absorbing characteristics, in particular a dye, is applied to the polished surface to make light propagating in the fiber to be absorbed in a controlled way.

In the optic fiber correlator as disclosed in patent U.S. Pat. No. 4,927,223 a D-fiber is used being in contact, at its flattened surface with a material which is non-centro-symmetrical in order to obtain frequency doubling. To the opposite fiber ends laser diodes are connected injecting light of the same wavelengths to the D-fiber. Light emitted by the layer is collected to find the correlation of the signals from the laser diodes.

In an optical device disclosed in the European patent application EP-A1 0 254 509 an optical D-fiber may be provided with a layer on the flat surface, the layer being of a material having a refractive index varying with optical intensity. The free surface of the layer is illuminated by coherent light beams to form a standing wave of a modulated refractive index in the layer resulting in a modulated index grating.

SUMMARY

Here we disclose a device that combines the large non-linearities of semiconductor materials with the guiding properties of optical fibers. This device can be used as a fiber-based nonlinear optical coupler that is controlled by a relatively weak light signal. The same device can be used as a laser, and in a number of other applications.

Thus, generally the invention is concerned with an optical device comprising a wave-guide with a core, a layer being arranged, which has a uniform thickness and is located in parallel to and at a uniform distance from the core. The distance is such that the evanescent electromagnetic field of light propagated along the wave-guide extends into the layer. In order to influence the light wave, the material of the layer is selected to have non-linear optical properties. The wave-guide is preferably dimensioned for propagating light of only one wavelength, that is it is monomode.

The material is preferably optically homogeneous or centro-symmetric. It may have a refractive index for light of a first kind having a considered wavelength and suitable for propagation along the wave-guide, where the value of the refractive index, in particular for wavelengths close to the wavelength of the light of the first kind, is dependent, on light of a second kind which is some manner is arranged to interact with the material and has a wavelength different from that of the first light, that is the refractive index of the material for wavelengths about the wavelength of the first light varies significantly, when there is a change in the second light. In particular, the value of the refractive index may be dependent on the intensity of the light of the second kind.

The material is in a preferred embodiment a semiconductor with a bandgap. Then as above first light may be propagated along the wave-guide and second light may be arranged to interact with the semiconductor material in the layer. The wavelength of the second light can in that case correspond to an energy value well exceeding the bandgap, so that photons of the second light are absorbed in the material creating an electron-hole pair. The wavelength of the first light then is selected to have a value corresponding to an energy value significantly below that of the bandgap, so that essentially no electron-hole pairs are created by absorption of the first light.

For the dimensioning of the device, it can be mentioned that the distance from the layer to the core of the wave-guide may be smaller than the diameter of the core to fulfill the condition of the evanescent field extending into the layer. The thickness of the layer is generally small to allow a good adherence to the waveguide and it may in particular be a small fraction of the diameter of the core of the wave-guide, in particular in the range of ⅛ to 1/80 thereof, most preferred in the range of 1/16 to 1/80 thereof.

In one embodiment the wave guide comprises a first optical D-fiber which as conventional has a curved surface corresponding to a portion of the surface of a circular cylinder, normally essentially a semi-cylindrical surface, and a flat surface. The flat surface should then be located in parallel with the core of the D-fiber and at a small distance from the core and the layer should then be arranged on the flat surface.

In an interferometric device, an optical coupler may be arranged which as conventional has first and second parallel ports at a first side and first and second ports at a second side. The two ports at one side can be joined by a wave-guide, and a first light source provides signal light to a port at the other side. The layer should then be arranged at a segment of the joining wave-guide in order to control the signal light. Therefore, a second light source may be arranged providing control light and directing it for interaction with the material of the layer. The second light source is in a first alternative arranged to direct the control light directly to a free surface of the layer. In a second alternative, the second light source is arranged to instead provide the control light to one port at the other side of the coupler. A phase-delaying device is then advantageously arranged in the joining wave-guide and it delays light derived from the signal light in order to allow the control light to work in an on-off fashion, controlling the signal light to either one of the ports at the ether side of the coupler.

The device constructed of a coated D-fiber can for some uses be completed by a second optical D-fiber also having a substantially semi-cylindrical surface and a flat surface, for instance of the same kind as the first one. The flat surface of the second D-fiber is then arranged against the free surface of the layer, that is the surface which is opposite to the first D-fiber.

Such a double D-fiber device can be used for coupling purposes. Then there is a first light source providing signal light, where the light source is arranged to provide the signal light to a first end of the first D-fiber. A second light source provides control light, so that the control light is input to a first end of the second D-fiber. The first ends of the D-fibers are preferably defined to be those two ends which permit the signal and control light to propagate along the cores of the D-fibers in parallel to and in the same direction as each other, but it is also possible to define the first ends so that the signal and control light propagate in the opposite directions. The second ends of the D-fibers are naturally those which are opposite to the first ends. The second ends are then attached to signal light receiving and/or transmission means. Alternatively the control light can be provided to the first end of the first D-fiber, that is the same end as the signal light.

The configuration comprising two juxtaposed D-fibers can be characterized generally by the feature that the basic wave-guide, in addition to the core mentioned initially above, comprises another core extending in parallel to the first mentioned core. The layer should then be located at the same uniform distance of the two cores, whereby the evanescent electromagnetic fields of light propagated along the two cores extend into the layer.

In an advantageous, particular embodiment thereof there is a first D-fiber which has two cores extending in parallel to each other and to the flat surface and located at the same distance of the flat surface and symmetrically in the D-fiber. In another embodiment the device comprises a planar structure, where the two cores are arranged in the flat surface a substrate. This surface is covered by a layer of having substantially the same refractive index as the substrate. The surface of this layer is in turn coated with a layer of a material having non-linear optical properties as above.

These twin-core devices can be used for coupling as the double D-fiber.

For use as a laser the general device as described above may comprise a light source providing pump light. This source is arranged to inject the pump light to a first end of the wave-guide to make it propagate along the core into the region where the layer is positioned close to the core. The pump light is selected to have such a wavelength and intensity that it will cause stimulated emission of light in the material of the layer. From a second end of the wave-guide opposite to the first end thereof then the light produced by the stimulated emission can be directed to some other device.

As to the dimensions of the layer, in this case in particular for confinement of the lasering region, the layer has a width, that is a dimension in a transverse direction in relation to the longitudinal direction of the wave-guide core and in parallel with the surface of the wave-guide, which corresponds to only a few times the diameter of the core, in particular three core diameters at most, and at least one core diameter. Then the layer may be located on a flat surface of the wave-guide or it may be located in a groove in the material of the wave-guide, where the groove then extends in parallel to the wave-guide core. The interferometric device can also be described as comprising a coupling means having a first and a second pair of optical communication ports in which optical pulse signals received at a port of one pair are coupled substantially equally into the each port of the other pair. It further comprises an optical waveguide optically coupling together the second pair of ports. The optical waveguide includes a portion where light propagating in the waveguide will sense a non-linear refractive index, where this portion comprises a waveguide having a core and a piece of material, which typically is the "layer" mentioned above, being located at such a distance from the core such that the evanescent electromagnetic field of light propagated along this waveguide and its core extends into the material. This material should then exhibit non-linear optical characteristics. The piece of material or "layer" can then have a free surface, arranged so that a light source provides control light to the free surface for interaction with the material. Alternatively, a light source is arranged to provide control light to one port of the first pair.

The optical device for use for coupling purposes can be generally described as comprising a wave-guide with two cores for guiding light waves along each one of the cores, where a piece of material located at such distances from the cores, that the evanescent electromagnetic field of light propagated along each wave-guide core extends into the piece of material. As above, the material thereof should have non-linear optical properties.

An optically controlled coupler system, switching or modulating system, including such a two-core device, can be described as comprising generally a coupling means having a first and a second pair of optical communication ports. It further comprises a first light source providing signal light to a first one of the first pair of ports and a second light source providing control light to the first one or a second one of the first pair of ports. The ports of the second pair are each one as above attached to separate signal light receiving and/or transmission means. The coupling means comprises a wave-guide with two cores for guiding light waves along each one of the cores and a piece of material, the above "layer", located at such distances from the cores, that the evanescent electromagnetic field of light propagated along each wave-guide core extends into the piece of material. Like above, the material should have nonlinear optical properties.

An optically pumped laser structure as set out above comprises then generally a wave-guide with a core. It further comprises a piece of material or layer located at such a distance from the core, that the evanescent electromagnetic field of light propagated along the wave-guide extends into the piece of material or layer. The material should then have non-linear optical properties. One end of the waveguide is adapted to receive pump light from a light source and the other end is adapted to issue light obtained by stimulated emission in the piece of material.

Also in this case, the waveguide may have a second core, such that light waves are able to propagate along each one of the two cores. The piece of material is then located at such distances from the cores, that the evanescent electromagnetic field of light propagated along each one of the wave-guide cores extends into the piece of material.

The piece of material or layer may in the laser structure have a free surface being adapted to receive pump light from a light source.

BRIEF DESCRIPTION OF THE DRAWINGS

The invention will now be described as a number of non-limiting embodiments, with reference to the accompanying drawings in which FIG. 4a shows a coated D-fiber structure of the twin-core type, FIG. 4b shows a planar wave guide structure with a layer of a non-linear optic material, FIG. 5a shows a partially coated D-fiber for use as a laser, FIGS. 5b and 5c show alternative coating arrangements which may be suitable for use in lasers, FIG. 6 schematically shows a laser arrangement utilizing a coated D-fiber, FIG. 7 schematically shows a laser arrangement utilizing a structure having two wave guide cores.

DETAILED DESCRIPTION

Single D-fiber

Figure 1:
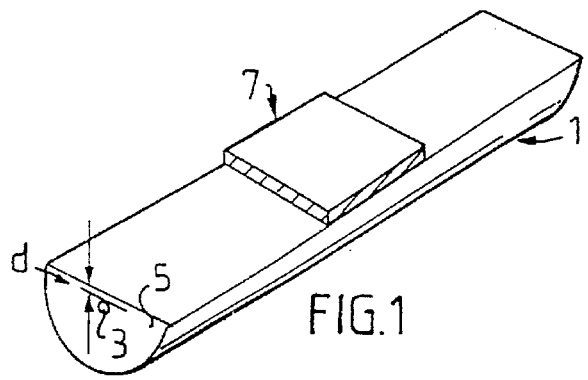
FIG. 1 shows a partially coated D-fiber.

In FOG. 1 a device is illustrated comprising a D-shaped fiber 1 having a core 3 and a cladding 5 and coated on its flat surface over some length of the fiber with a thin layer 7 of a material that is highly nonlinear, such as a semiconductor. The length of the coating in the longitudinal direction of the fiber may as illustrated correspond to about the exterior diameter of the D-fiber and the coating may cover whole the flat surface of the fiber in the transverse direction. The length may however be adapted to the particular field of use and the materials used to obtain the desired effects to be discussed below. The D-fiber 1 may have dimensions matching ordinary single-mode communication fiber, e.g. have an outer cladding diameter of approximately 125 µm and a core diameter of 8–10 µm, and should also ideally be single mode at the wavelength of interest.

The core-flat surface distance d in the D-shaped fiber 1 should be such that the evanescent field of the light propagating through the fiber i can interact with the film 7, this meaning that the core-flat distance d is only a small portion of the core diameter. The D-fiber to be used should then in practical cases have a core-air distance d of a few micrometers or less, that is this distance d of the core 3 to the flat surface of the fiber 1 can be for instance of the magnitude of order 2 µm.

The thickness of the coating film 7 is uniform and is normally much smaller than the diameter of the core. It may be typically 1 µm or less, for instance 0.1–0.5 µm. A thicker film cannot be used since it will not adhere permanently to the flat surface of the D-fiber due to different dilatation coefficients.

The coating material in the layer 7 can be GaAs, InP, InGaAsP, and other III-V semiconductors, silicon and germanium based materials, such as amorphous Si, amorphous Go, silicon carbide, porous Si, etc., II-VI semiconductors such as CdTe, CdS, case and composites, and materials such as LiF, NaF, NaCl and other halogen alkalides. A preferred material for the film of many devices may be amorphous Si. The material can be deposited by some ordinary method such as some CVD technique and it is generally not necessary to grow the material in situ. It can also be further processed by ion or e-beam bombardment or UV irradiation. The fabrication of the device might also include an annealing process where the deposited material is heated and then cooled to the ambient temperature in order to alter the properties of the material, such as the recombination time of the charge carriers thereof. Structures comprising multiple thin films such as a single and multiple quantum well structures of III-V or other semiconductors can also be deposited on the flat surface of the fiber i and act as the highly nonlinear medium. The material deposited can either be amorphous or crystalline. Other materials of interest, such as films of rare-earth metals can be used. In the following we will refer to the film 7 as made of a semiconductor material, but all other materials described above are in the spirit of the invention. We will refer to the device as a Semiconductor Coated Fiber (SCF).

Physical Process

When a semiconductor, metallic or dielectric material 7 is deposited on the flat surface of a D-shaped fiber like 1, the wave propagating in the longitudinal direction of the fiber i can have its field extending into the material 7. In this case, the transverse mode of the propagating light depends on the real and imaginary parts of the linear and nonlinear susceptibilities of the material of the film 7. Together with the parameters of the fiber, such as the refractive indices of the core 3 and cladding 5, the radius of the core 3, and the distance d core-flat surface, the properties of the material determine the effective refractive index experienced by the light propagating in the fiber, the chromatic dispersion, absorption, gain, polarization properties, and nonlinear effects such as phase modulation and frequency conversion for the light.

Signal and Control Light

In a number of applications of the devices disclosed herein light of two different wavelengths is used, referred to as "signal" light and "control" light (corresponding to the terms "first light" and "second light"). Generally (but not necessarily) the signal light has a photon energy close to or below the energy which is necessary to promote electrons from the valence (low mobility) to the conduction (higher mobility) band, i.e., the deposited material is "transparent" to the signal light. On the other hand, for the control light, the photon energy exceeds the energy band gap of the material. As an example, light at a wavelength 0.85 μm can be used as control light for a film of InGaAs (bandgap for instance typically 1.3–1.55 μm). In this case, the absorption of the control light photons creates mobile electrons in the material, temporarily affecting its properties. It can strongly alter the refractive index, and also shift the band gap through the Stark effect. Even the creation of mobile electrons through heat can induce a change in the refractive index.

Thus, generally materials are used, the optical properties of which for a particular wavelength, i.e. that of the signal light, are changed when the materials interact with the control light in some way, for example as above by absorption of photons creating electron-hole pairs, by absorption creating heat in the material increasing its temperature. The materials preferred are optically homogeneous, for example amorphous, resulting in structures which can be manufactured easily and non-costly.

Interferometer

A change in the refractive index of the coating material can be exploited amongst others, for switching, for modulation, and for mode-locking lasers. It can be advantageous to make use of an interferometric arrangement such as that disclosed in the patent U.S. Pat. No. 4,973,122 and also in U.S. Pat. No. 4,962,987. There an optical cross-coupled interferometer is disclosed where the control light is fed to one of the ports of the coupler and two parallel ports are joined by a loop. Incoming light is split in two parts (generally of the same power), which suffer different phase shifts depending on the presence of the control light. When they are recombined, even a small influence of the control light can greatly affect the amplitude of the emerging signal light.

Figure 2:
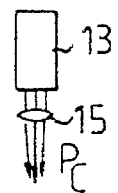
FIG. 2 shows the fiber of FIG. 1 as employed in an interferometric device.
Figure 2:
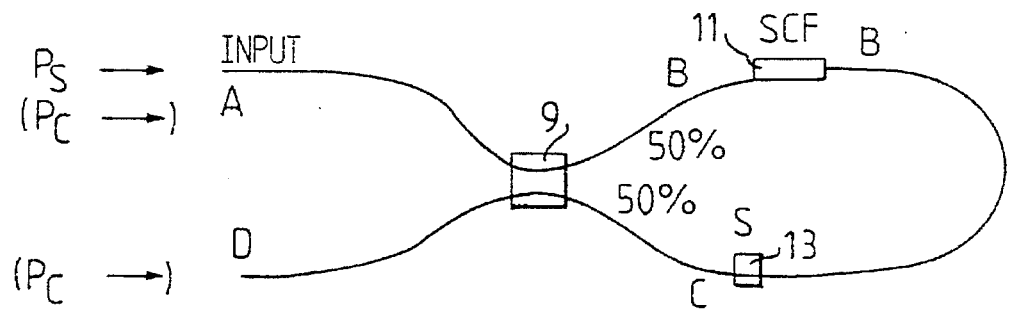

One example of arrangements that can be used is illustrated in FIG. 2, where the so-called nonlinear loop mirror configuration is used. A coupler 9 has two parallel ports A and D at one side and two parallel ports B and C at the other side. The signal light $P_s$ is coupled into the port A of the coupler 9 that divides the signal light $P_s$ into two components of approximately equal power, to the ports B and C at the other side of the coupler. A device 11 of the kind illustrated in FIG. 1 is at one end connected to one of these ports like B. The other end of the device 11 is then joined to the other parallel port C at the same side. In this way, half of the signal light leaving the coupler 9 travels through first port B, through the device 11 and then to port C. The other half travels first through port C, and then through the device 11 and back to port B. Both light components then recombine at the coupler 9. A set of fiber strainers 13 such those designated as Manual Polarisation Controllers, manufactured by the company BT & D, can be provided along one of the paths, e.g. as illustrated in the path joining the device 11 with port C.

In the absence of control light the fiber strainers 13 can be adjusted so that all signal light recombines at the coupler 9 and returns through the input port A. In this state, no signal light exits through port D, that is the port which is parallel to port A and at the same side of the coupler. In the presence of control light $P_c$, however, e.g. as obtained from a light source comprising a laser 13 and a lens system 15 and illuminating the surface of the film of the device 11, the refractive index of the deposited material in the coating film in the device 11 is altered. For a given control light power, the relative phase shift introduced between the signal light components can lead to all signal light recombining at the coupler 9 being directed to port D. The exact position of the device 11 in the loop joining ports B and C can be important, particularly if the control light is continuous and not pulsed.

The control light may also be injected by port A and D producing the same change of refractive index of the coating in the device 11.

Nonlinear Coupler—Modulator

Figure 3A:
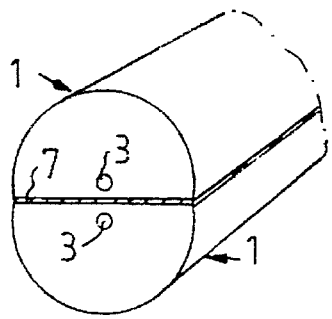
FIG. 3a shows a double D-fiber structure with a film therebetween, FIG. 3b schematically shows the structure of FIG. 3a as employed in an optic coupler.

The devices described above make use of a single SCF. Two D-shaped fibers 1 can also be placed with the flat surfaces in a back-to-back arrangement, with the semiconductor film 7 lying between the two cores 3, as shown in FIG. 3a. We call this the double structure SCF. In order to position the fibers as illustrated, with the two cures in parallel with each other and at a minimum distance, two fixtures can be used, each one with one fiber. The fixtures can be made of a softer material than glass, such as a plastics material or soft metal. One possible way to make the fixtures is to use a D-fiber as a mould for a liquid phase solution of the fixture. The D-fiber should be kept straight. After solidifying the solution, the fixture is ready to accommodate one of the D-fibers used in the double structure SCF. Once the fibers are positioned as illustrated in FIG. 3a with the cores 3 in parallel, the fixtures can be glued together.

Figure 3B:
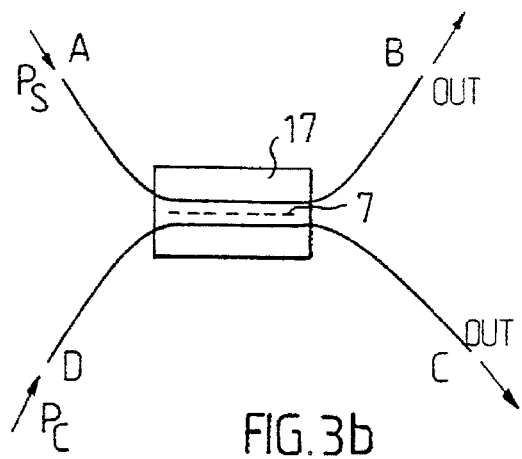

The nonlinearity of the semiconductor film 7 can in this case be exploited by sending control light $P_c$ of appropriate wavelength through an input control port D of the device as illustrated in FIG. 3a used as a controlled coupler 17, c.f. FIG. 3b, having ports A and D at one end thereof and ports B and C at the other end. Signal light $P_s$ entering port A in parallel to the aforementioned control light $P_c$ can be affected by the control light $P_c$ entering port A. In the absence of the control light $P_c$, the signal light $P_s$ leaves the device 17 at either port B or C as in a conventional coupler, see "Optical Waveguide Theory", A. W. Snyder, J. D. Love, Chapman and Hall, London 1983, pps. 387–399, 568–574. In the presence of control light $P_c$, the fraction of the light leaving ports B and C can be controlled. Even a weak signal $P_c$ can substantially modify the transfer function of the coupler, and therefore a weak signal $P_c$ can control a stronger signal $P_c$ as in a transistor.

The nonlinear coupler described above can also be used as a high speed optical modulator. A continuous wave signal (signal light) $P_s$ coupled into port A of the device can be switched on and off in ports B and C by a control light pulse $P_c$ coupled into port D. When the modulation depth is sufficiently large, the device operates as a switch. Since the device is relatively insensitive to the wavelength of the control light $P_c$, even heavily chirped light pulses can be used to control the spectrally pure signal $P_s$ coupled into port A. The high speed of the device is based on the fact that the free-carriers photoinduced in the semiconductor in the film 7 in the device 17, by the absorption of the control light pulse can relax rapidly, so that bit rates of several Gbits/s should be achieved. The optical signal that leaves the device through ports B and C can therefore have a narrow bandwidth and high speed modulation.

Integrated Twin-Core Structures

Although the specific geometry described above is convenient for many applications, other arrangements can be used in the same spirit. For example, a twin-core D-shaped fiber can have the coupling characteristics controlled by the activation of a semiconductor film, as illustrated in FIG. 4a. The D-fiber 19 has two cores 3', 3", which are disposed in parallel symmetrically and centrally, close to the center line of the circular-cylindrical outer surface of the fiber 19 and as above close to the flat surface. Here also, the evanescent field of the control light propagating in one of the fiber cores 3', 3" penetrates the semiconductor film 7 coated on the flat surface, altering its properties, and thus the propagation characteristics of signal light travelling in the other core. The twin-core structure of FIG. 4a can be used like the double D-fiber of FIG. 3a, e.g. in the coupler as illustrated in FIG. 3b.

Planar Structures

Even discrete components based on a glass substrate with buried waveguides can be used for controlled coupling, switching and modulation. As is illustrated in FIG. 4b, a pair of waveguides 21 can be fabricated on a glass substrate 23 by ion implantation or thermal indiffusion. Further evaporation of a layer 25 of silicon oxides $SiO/SiO_2$ might be desirable, leaving the waveguides 21 immersed in the glass matrix. A film 7 of semiconductor material is then deposited on the top surface of the buried waveguides 21, so that the evanescent field of the light in the waveguides 21 extends into the semiconductor material 7. Switching from one into various channels should be possible, and the fraction of the signal switched can be controlled by light, travelling along a waveguide or incident on the device from the outside (e.g., perpendicularly). The buried wave-guide structure of FIG. 4b can be used like the double D-fiber of FIG. 3a.

A similar idea has been suggested by Kawachi in "Silica Waveguides on Silicon and their Application to Integrated-Optic Components", Optical and Quantum Electronics 22 (1990), pps. 391–416, however in that case the waveguide was fabricated on top a semiconductor material, e.g. silicon.

Laser

The devices comprising a SCF described so far make use of a control light input that effectively alters the attenuation and the refractive index of the material. Semiconductors, on the other hand, are widely used as laser materials. Generally, laser pumping is electrical, but light has also been used to pump laser structures. The pump light should have enough photon energy to be absorbed by the film, creating an excess of electrons in the excited state and an excess of holes in the lower energy band. Upon radiative recombination, the semiconductor will luminesce. Provided the pump light is sufficiently intense it will cause stimulated emission and laser action in the semiconductor film. The high refractive index of the semiconductor material favours guiding of light in the plane of the semiconductor film. Gain guiding is often sufficient to ensure that the device operates above laser threshold. Since the pump field overlaps the semiconductor film only in the region neighboring the core of the fiber, the width of the film where laser operation is taking place, is limited to less than approximately 10 μm. A structure similar to that depicted in FIG. 1 can be used as is illustrated in FIG. 5a.

In order to further confine the field to the pumped region adjacent to the core of the fiber, the unpumped region of the semiconductor may be removed by lithographic processes, as illustrated in FIG. 5b. On the flat surface of the D-fiber 1 there will thus only be a narrow band or strip 7' of a semiconductor material extending centrally on the surface, in parallel to the fiber core 3. Alternatively, the D-shaped fiber can have its cross sectional profile altered as shown in FIG. 5c. On the flat surface of the D-fiber 1' there is a shallow groove 27 close to and in parallel to the fiber core 3 and the semiconductor film 7" is deposited in the groove 27. This will ensure that only the narrow strip 7' or 7" of semiconductor material guides light.

The structures of FIGS. 5b and 5c will be able to provide laser action even in the absence of end mirrors, provided that the gain is sufficient. End mirrors may otherwise be provided by the use of coated or uncoated fiber end surfaces or by Bragg reflection. The active length of the laser can be as long as several centimeters corresponding to the longitudinal length of the coating 7 (FIG. 5a). Typical materials that can be employed would be those which have a high quantum efficiency for luminescence. III-V semiconductors such as GaAs deposited by MOVCD or MBE techniques, for example, can be used, as well as ternary compounds. The wavelength for laser operation will be those associated with the material bandgap (e.g. 0.85 μm for GaAs). Other materials of interest will be halogen alkalide films with colour centers, such as the f-center of LiF or LiI. Such materials have a number of luminescence peaks in the visible and near infrared. The light generated in such a laser is guided along the film, but the near presence of the core of the fiber can also lead to light guidance in the core.

A laser arrangement is schematically illustrated in FIG. 6. Pump light 29 from a suitable source 31 focused by a lens system as illustrated at 33 is injected to one end of the D-fiber 1. With a proper choice of components and parameters laser light 35 is emitted from the other end of the D-fiber and it can be parallelized by a lens system as illustrated at 37.

The geometry with two parallel wave guide cores as illustrated in FIGS. 3a and 3b and also in FIGS. 4a and 4b can also be used as a laser device, where the laser output would be collected along the output ports B and C, cf. FIG. 7, with the pump light injected along port A. When the pump light $P_p$ is absorbed by the semiconductor film 7 in the coupler 17", it may as above by a proper choice of parameters and materials give rise to an excess of electrons in the excited state band and an excess of holes in the lower energy band. Upon radiative recombination, the semiconductor material will luminesce.

Although the aforementioned arrangements are convenient from a practical device viewpoint, other pumping geometries can be considered, such as externally pumping a single-structure semiconductor coated fiber of the kind described with reference to FIGS. 1 and 2.

What is claimed:

1. An optical device, comprising:

a waveguide having a first substantially cylindrical core; and a layer having a uniform thickness and located parallel to and at a uniform distance from the first core, wherein the distance is such that an evanescent electromagnetic field of light propagated along the waveguide extends into the layer, and the layer is of a material having nonlinear optical properties.

2. The optical device of claim 1, wherein the waveguide is monomode, constructed for propagating light of only one wavelength.

3. The optical device of claim 1, wherein the material is optically homogenous or centro-symmetric.

4. The optical device of claim 1, wherein the material has a refractive index for first light of a wavelength propagated along the waveguide, a value of the refractive index depending on second light interacting with the material and having a different wavelength.

5. The optical device of claim 1, wherein the material has a refractive index for first light of a wavelength propagated along the waveguide, a value of the refractive index depending on an intensity of second light interacting with the material.

6. The optical device of claim 1, wherein the material is a semiconductor having a bandgap, first light is propagated along the waveguide, second light is arranged to interact with the semiconductor material in the layer, a wavelength of the second light corresponds to an energy value well exceeding the bandgap so that photons of the second light are absorbed in the material creating electron-hole pairs, and a wavelength of the first light has a value corresponding to an energy value significantly below that of the bandgap so that substantially no electron-hole pairs are created by absorption of the first light.

7. The optical device of claim 1, wherein the distance from the layer to the first core of the waveguide is smaller than a diameter of the first core.

8. The optical device of claim 1, wherein a thickness of the layer is a small fraction of a diameter of the first core of the waveguide, the fraction being in a range of $1/8$ to $1/80$, most preferably in a range of $1/16$ to $1/80$.

9. The optical device of claim 1, wherein the waveguide comprises a first optical D-fiber having a substantially semi-cylindrical shape and a flat surface, the flat surface is located parallel to and at a small distance from a core of the D-fiber, and the layer is arranged on the flat surface.

10. The optical device of claim 1, further comprising an optical coupler having first and second parallel ports at a first side and first and second ports at a second side, wherein the first and second parallel ports at the first side are joined by a joining waveguide, a first light source is arranged to provide signal light to one of the first and second ports at the second side, and the layer is arranged at a segment of the joining waveguide.

11. The optical device of claim 10, further comprising a second light source arranged to provide and direct control light for interaction with the material of the layer.

12. The optical device of claim 11, wherein the second light source is arranged to direct the control light directly to a free surface of the layer.

13. The optical device of claim 11, wherein the second light source is arranged to provide the control light to one of the first and second ports at the second side of the optical coupler.

14. The optical device of claim 10, further comprising a phase-delaying device arranged in the joining waveguide, wherein the phase-delaying device delays light derived from the signal light.

15. The optical device of claim 9, further comprising a second optical D-fiber having a substantially semi-cylindrical shape and a flat surface, wherein the flat surface is arranged against a surface of the layer that is opposite to the first D-fiber.

16. The optical device of claim 15, further comprising:
a first light source arranged to provide signal light to a first end of the first D-fiber;
a second light source arranged to provide control light to a first end of the second D-fiber; and
second ends of the first and second D-fibers opposite the respective first ends and attached to means for receiving and/or transmitting signal light.

17. The optical device of claim 15, further comprising:
first ends of the first and second D-fibers;
a first light source arranged to provide signal light to the first end of the first D-fiber;
a second light source arranged to provide control light to the first end of the first D-fiber; and
second ends of the first and second D-fibers opposite to the first ends and attached to means for receiving and/or transmitting signal light.

18. The optical device of claim 9, wherein the first D-fiber has two cores extending parallel to each other and to the flat surface, and the two cores are located symmetrically in the first D-fiber at the same distance from the flat surface.

19. The optical device of claim 1, wherein the waveguide further comprises a second core extending parallel to the first core, and the layer is located at the same uniform distance from the first and second cores such that evanescent electromagnetic fields of light propagated along the first and second cores extend into the layer.

20. The optical device of claim 19, wherein the device has a planar structure, the first and second cores are arranged in a flat surface of a substrate, the flat surface is covered by a layer which has a refractive index that is substantially the same as a refractive index of the substrate and which is coated with a material having nonlinear optical properties.

21. The optical device of claim 19, further comprising:
a first light source providing signal light, wherein the first light source is arranged to inject the signal light into the waveguide to make the signal light propagate along a first core of the waveguide from a first end of the first core;
a second light source providing control light, wherein the second light source is arranged to inject the control light into the waveguide to make the control light propagate along a second core of the waveguide from a first end of the second core; and
second ends of the first and second cores opposite the respective first ends and attached to respective means for receiving and/or transmitting signal light, wherein each receiving and/or transmitting means receives light propagating along its respective one of the first and second cores.

22. The optical device of claim 19, further comprising:
a first light source providing signal light, wherein the first light source is arranged to inject the signal light into the wavegulde to make the signal light propagate only along a first core of the waveguide from a first end thereof;
a second light source providing control light, wherein the second light source is arranged to inject the control light into the waveguide to make the control light propagate along the first core of the waveguide from the first end; and
a second end of the waveguide opposite the first end and attached to two means for receiving and/or transmitting signal light, wherein the two receiving and/or transmitting means receive light propagating along a corresponding one of the first and second cores.

23. The optical device of claim 1, further comprising a light source providing pump light, wherein the light source is arranged to inject the pump light in one end of the waveguide to make the pump light propagate along the first core into a region where the layer is positioned close to the first core, the pump light has a wavelength and an intensity that stimulates emission of light in the material of the layer, and one end of the waveguide is arranged to output the light produced by the stimulated emission.

24. The optical device of claim 1, wherein the layer has a width that is at least substantially equal to a diameter of the first core and at most substantially three times the diameter of the first core.

25. The optical device of claim 19, wherein the layer is located in a groove in the material of the waveguide, and the groove extends parallel to the first and second cores.

26. An interferometric device, comprising:

means, having a first pair and a second pair of optical communication ports, for coupling optical pulse signals received at a port of one pair of the first and second pairs substantially equally into each port of another pair of the first and second pairs; and an optical waveguide optically coupling together the second pair of ports, wherein the optical waveguide includes a portion where light propagating in the waveguide senses a nonlinear refractive index; the portion comprises a waveguide having a core and a piece of material located at a distance from the core such that an evanescent electromagnetic field of light propagated along the waveguide and core extends into the material; and the material has nonlinear optical characteristics.

27. The interferometric device of claim 26, wherein the material has a free surface, and the interferometric device further comprises a light source providing control light, the light source arranged to direct the control light to the free surface for interaction with the material.

28. The interferometric device of claim 26, wherein a light source is arranged to provide control light to one port of the first pair.

29. An optical device, comprising:

a waveguide having two substantially cylindrical cores for guiding light waves along each core; and a piece of material having nonlinear optical properties, wherein the piece of material is located at distances from the cores such that an evanescent electromagnetic field of light propagated along each core extends into the piece of material.

30. The optical device of claim 29, wherein the waveguide comprises two optical D-fibers placed on each side of the piece of material.

31. The optical device of claim 29, wherein the waveguide comprises an optical D-fiber having two cores.

32. The optical device of claim 29, wherein the waveguide comprises a planar structure having two cores extending in parallel in a first part, and the piece of material is located on a surface of the first part.

33. The optical device of claim 32, wherein the first part includes a substrate having the two cores arranged in a surface thereof, and the surface is covered by a layer of a material that is optically similar to a material of the substrate.

34. An optically controlled system for carrying out at least one of the functions of coupling, switching, and modulating, the system comprising:

coupling means, comprising a first pair and a second pair of optical communication ports, a waveguide having two cores for guiding light waves along each core, and a piece of material having nonlinear optical properties and located at distances from the cores such that an evanescent electromagnetic field of light propagated along each core extends into the piece of material;

a first light source for providing signal light to a first one of the first pair of ports; and a second light source for providing control light to the first one or a second one of the first pair of ports, wherein the ports of the second pair are each attached to a respective means for receiving and/or transmitting signal light.

35. An optically pumped laser structure, comprising:

a waveguide having a core; and a piece of material having nonlinear optical properties and located at a distance from the core such that an evanescent electromagnetic field of light propagated along the waveguide extends into the piece of material;

wherein one end of the waveguide is adapted to receive pump light from a light source, and at least one end of the waveguide is adapted to issue light obtained by stimulated emission in the piece of material.

36. The laser structure of claim 35, wherein the waveguide comprises a D-fiber, and the piece of material is located on a flat surface of the D-fiber.

37. The laser structure of claim 35, wherein the waveguide comprises a D-fiber, and the piece of material is located in a groove in a flat surface of the D-fiber.

38. An optically pumped laser structure, comprising:

a waveguide having a first core and a second core, wherein light waves are able to propagate along each core; and a piece of material having nonlinear optical properties and located at distances from the first and second cores such that evanescent electromagnetic fields of light propagated along the cores extend into the piece of material;

wherein one end of the waveguide is adapted to receive, at one end of the first core located at the one end of the waveguide, pump light from a light source, and another end of the waveguide is adapted to issue, at ends of the first and second cores located at the other end of the waveguide, light obtained by stimulated emission in the piece of material.

39. An optically pumped laser structure, comprising:

a waveguide having a core; and a piece of material having nonlinear properties and located at a distance from the core such that an evanescent electromagnetic field of light propagated along the waveguide extends into the piece of material, wherein the piece of material has a free surface adapted to receive pump light from a light source, and at least one end of the waveguide is adapted to issue light obtained by stimulated emission in the piece of material.

* * * * *